United States Patent [19]
Willis et al.

[11] Patent Number: 5,301,652
[45] Date of Patent: Apr. 12, 1994

[54] CONDENSING APPARATUS FOR STEAM COOKING DEVICE

[75] Inventors: Thomas J. Willis, Solon; James P. Bedford, Willoughby, both of Ohio

[73] Assignee: Cleveland Range, Inc., Cleveland, Ohio

[21] Appl. No.: 738,670

[22] Filed: Jul. 31, 1991

[51] Int. Cl.⁵ .............................................. A21B 1/08
[52] U.S. Cl. ...................................... 126/20; 126/369; 126/381; 165/900; 165/110
[58] Field of Search ............. 126/20, 20.1, 369, 369.1, 126/369.2, 369.3, 381; 165/110, 900; 99/476; 219/401

[56] References Cited

U.S. PATENT DOCUMENTS

| | | | |
|---|---|---|---|
| 1,471,573 | 10/1923 | Saxegaard | 126/20 |
| 3,210,005 | 10/1965 | Arnold | 392/401 |
| 3,443,633 | 5/1969 | Carnavos | 165/900 |
| 3,604,895 | 9/1969 | MacKay | 126/20 |
| 3,703,809 | 11/1972 | Cassidy | 165/900 |
| 3,992,984 | 11/1976 | Treiber | 126/369 |
| 4,417,619 | 11/1983 | Minami | 165/900 |
| 4,460,822 | 7/1984 | Alden et al. | |
| 4,462,308 | 7/1984 | Wang | |
| 4,506,598 | 3/1985 | Meister | 126/20 |
| 4,509,412 | 4/1985 | Whittenburg et al. | |
| 4,650,968 | 3/1987 | Williams | |
| 4,687,550 | 8/1987 | Wong | |
| 4,728,778 | 2/1988 | Choi et al. | |
| 4,739,698 | 4/1988 | Allaire | |
| 4,909,309 | 3/1990 | Palfalvi et al. | 165/110 |

FOREIGN PATENT DOCUMENTS

| | | | |
|---|---|---|---|
| 48636 | 4/1934 | Denmark | 165/110 |

Primary Examiner—Carroll B. Dority
Attorney, Agent, or Firm—Porter, Wright, Morris & Arthur

[57] ABSTRACT

A condensing apparatus for a steam cooking device comprising a heat exchanger for collecting steam from the cooking chamber of a steam cooking device and means for condensing the steam in the heat exchanger.

3 Claims, 2 Drawing Sheets

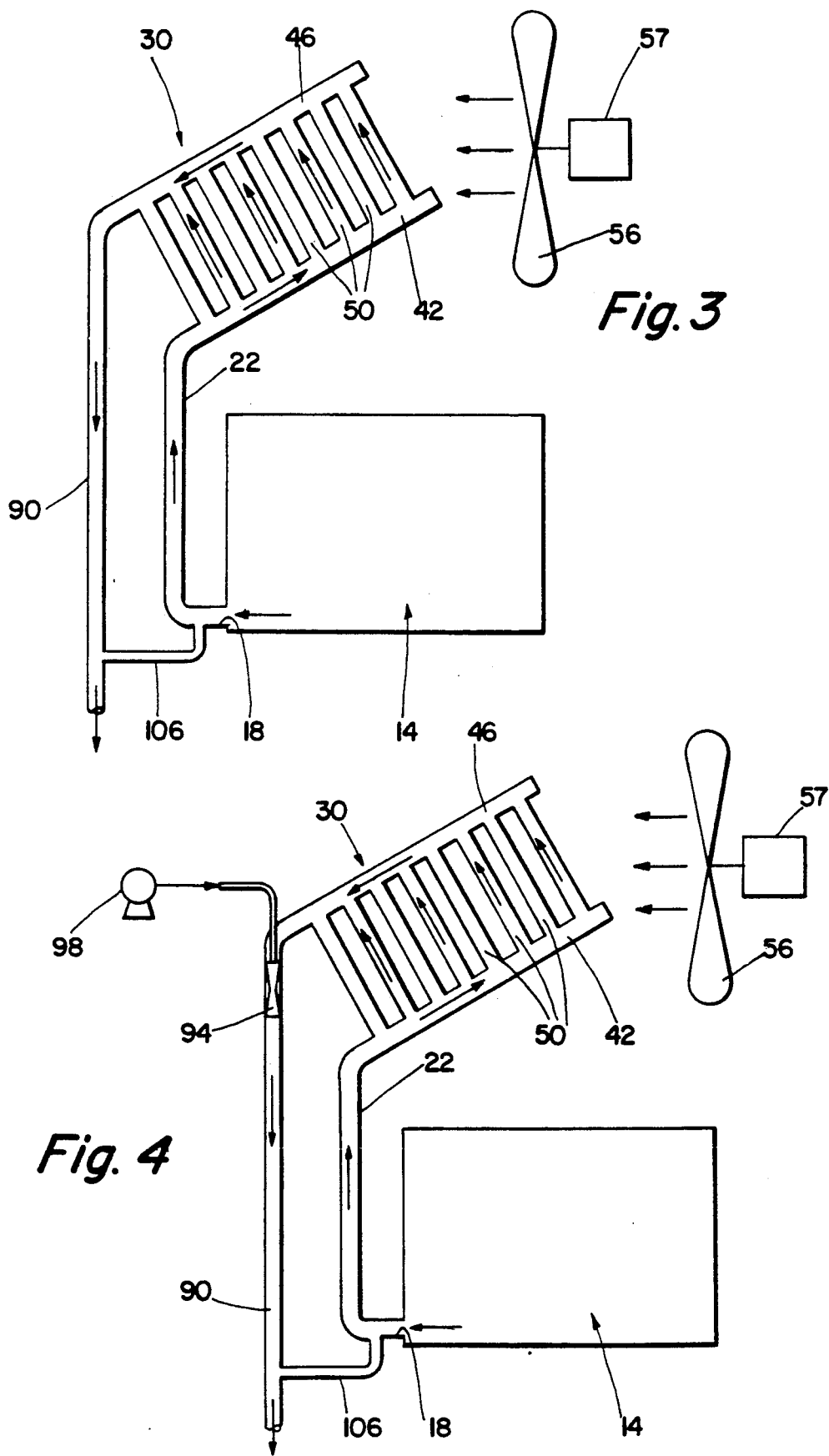

CONDENSING APPARATUS FOR STEAM COOKING DEVICE

BACKGROUND OF THE INVENTION

This invention relates to steam cooking devices, and particularly to arrangements for condensing steam from the cooking chamber of a steam cooking device.

The advantages of steaming certain foods rather than cooking these foods by other methods have become well-recognized in recent years. For example, when meats are cooked under dry conditions, as when baked, the meat loses its intrinsic moisture and may become dried out and unpalatable. Further, vegetables contain certain valuable minerals which are retained if the vegetables are steamed rather than cooked by other means, such as boiling.

Current steam cooking devices utilize steam generated in a boiler to cook or thaw food. This steam is transported from the boiler to a cooking chamber where it is introduced into the cooking chamber by a conduit or the like extending from the boiler to an opening in the wall of the cooking chamber.

After the steam has been introduced into the cooking chamber, an outlet is typically provided to allow the steam to exit the cooking chamber so that the steam will not condense in the cooking chamber and drop onto the food. The outlet also provides a steam drain to allow the cooking chamber to remain at atmospheric pressure.

SUMMARY OF THE INVENTION

The invention provides a steam cooking device comprising a cooking chamber adapted to receive steam and a condensing apparatus spaced from said cooking chamber and adapted to receive steam from said cooking chamber, said condensing apparatus including means for collecting said steam and fan means directed toward said collecting means to condense the steam in said collecting means.

The invention also provides a condensing apparatus for a steam cooking device comprising means for collecting steam from the cooking chamber of a steam cooking device and fan means directed towards said collecting means to condense the steam in said collecting means.

The invention also provides a method for condensing steam from the cooking chamber of a steam cooking device comprising the steps of transporting steam from the cooking chamber to a means for collecting steam from the cooking chamber and blowing air across said collecting means to condense the steam in said collecting means.

Various features and advantages of the invention will become apparent to those skilled in the art upon review of the following detailed description, claims and drawings.

BRIEF DESCRIPTION OF THE DRAWINGS

FIG. 3 is a schematic diagram illustrating the flow of steam in the present invention; and FIG. 4 is a schematic diagram of an alternative embodiment illustrating the flow of steam in the present invention.

Figure 1:
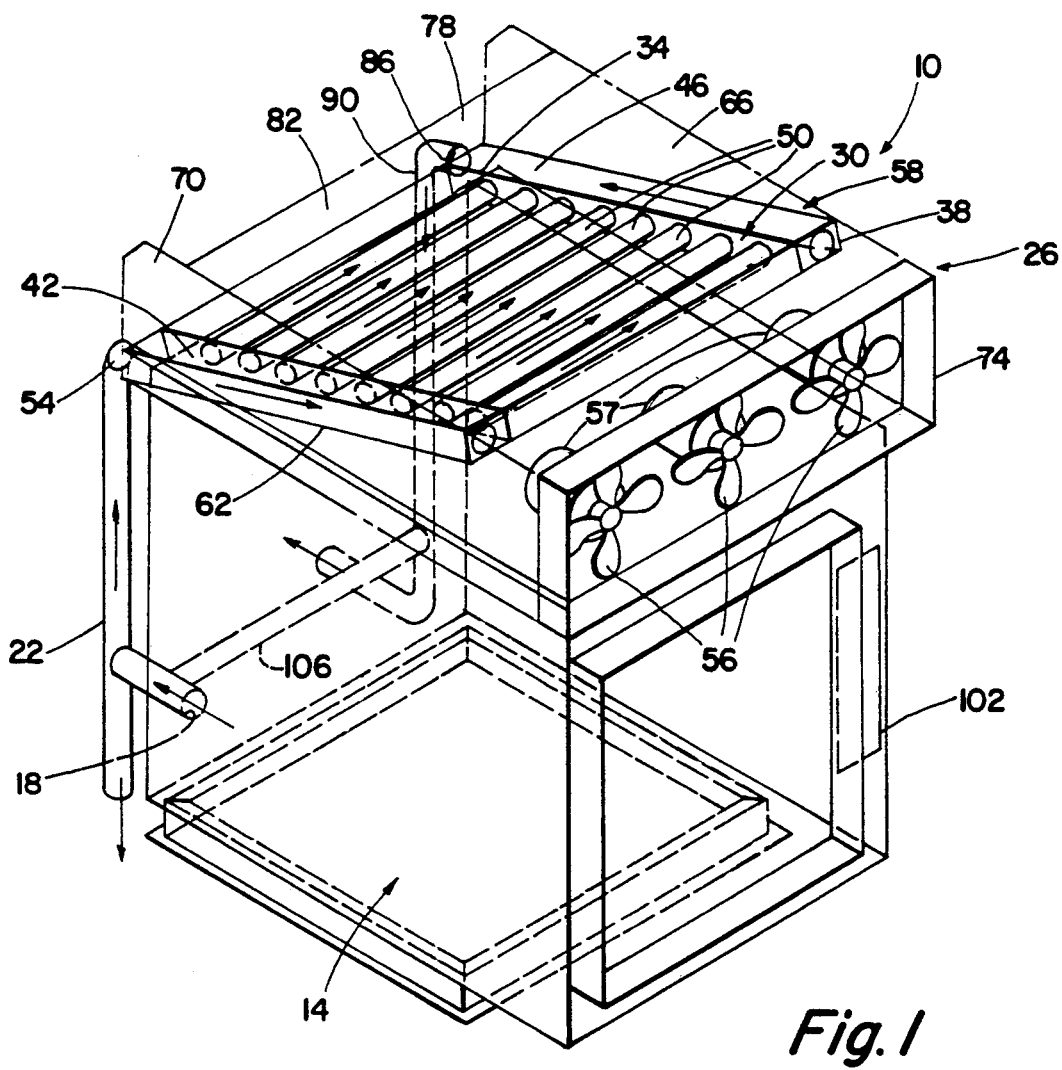
FIG. 1 is a perspective view of a steam cooking device embodying the present invention.

Before one embodiment of the invention is explained in detail, it is to be understood that the invention is not limited in its application to the details of construction and the arrangement of components set forth in the following description or illustrated in the drawings. The invention is capable of other embodiments and of being practiced or carried out in various ways. Also, it should be understood that the phraseology and terminology used herein is for the purpose of description and should not be regarded as limiting.

DESCRIPTION OF THE PREFERRED EMBODIMENT(S)

A steam cooking device 10 embodying the present invention is illustrated in FIG. 1.

Before the invention is explained in detail, it should be understood that the condensing apparatus of the present invention can be used with almost any steam cooking device having a cooking chamber which receives steam to cook or thaw food therein, the operation of which is well-known in the art. An example of a suitable steam cooking device is a Steamcraft® 5.1 Counter Type Convection Steamer manufactured by Cleveland Range, Inc., in Cleveland, Ohio.

The steam cooking device 10 includes a cooking chamber 14 adapted to receive steam. The cooking chamber 14 has therein an aperture 18, such as a drain or the like, which allows the steam to escape from the cooking chamber 14 so that the steam can be condensed outside of the cooking chamber 14.

Figure 2:
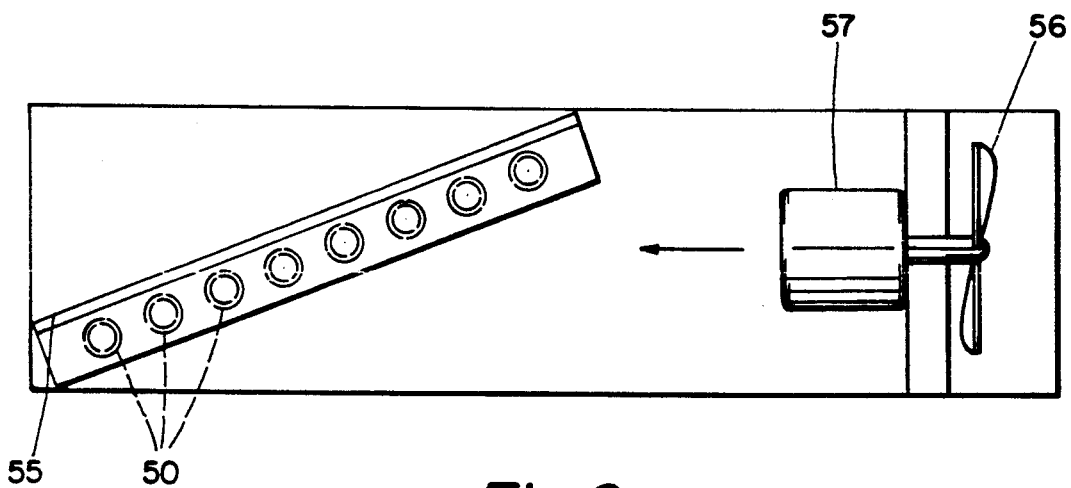
FIG. 2 is a side elevational view of the condensing apparatus of the present invention.

Once the steam exits the cooking chamber 14 through aperture 18, the steam enters a conduit 22 or other suitable transport means where it is transported to a condensing apparatus 26 which is illustrated as positioned adjacent to and above said cooking chamber 14. The position of the condensing apparatus 26 with respect to the cooking chamber 14 is a design choice. It is to be understood that other positioning of the condensing apparatus 26 is within the scope of this invention. The condensing apparatus 26 includes means for collecting the steam, such as a heat exchanger 30 having first and second ends 34 and 38 and which is comprised of first and second manifolds 42 and 46 as shown schematically in FIG. 3. Conduit means such as tube 50, and preferably a plurality of tubes 50, are included in the condensing apparatus 26, extending between the first and second manifolds 42 and 46 in fluid communication such that steam enters the first manifold 42 through an aperture 54 and travels from the first manifold 42 through the tubes 50 into the second manifold 46. The second manifold 46 is spaced from the first manifold 42 for proper heat exchange. The tubes 50 may be made of any suitable material such as copper. Further, the tubes 50 preferably have fins 55 (see FIG. 2) to provide an increased exposure to air.

The condensing apparatus 26 further includes fan means, such as three fans 56 driven by motors 57, which may be directed toward the heat exchanger 30 to condense the steam as it travels through the tubes 50 from the first manifold 42 to the second manifold 46. In this regard, the heat exchanger 30 is preferably inclined with the second end 38 being higher than the first end 34 such that the air from the fans 56 will contact all of the tubes 50 and so that gravity will assist the flow of condensed steam out the second manifold 46.

The heat exchanger 30 is preferably enclosed by a cabinet 58 having a bottom wall 62, side walls 66 and 70, a front wall 74 and a top wall 78 forming a duct to direct air from the fans 58 over the tubes 50. One skilled in the art will recognize that a duct is not necessary to accomplish air flow over the tubes 50. There may be an opening 82 at the end of the cabinet 58 opposite the front wall 74 to allow the air from the fans 56 to exit the cabinet 58.

The second manifold 46 contains an aperture 86 to allow the condensed steam (water) to exit the heat exchanger 30. A conduit 90 or other suitable drain means communicates with the aperture 86 to direct the water to a disposal or back to a separate water supply for reuse.

In an alternative embodiment, illustrated schematically in FIG. 4, a venturi tube 94 is inserted into the conduit 90 and a compressor 98 injects compressed air into the conduit 90 upstream of the venturi tube 94. The venturi tube 94 causes a drop in pressure as the water flows through the venturi tube 94. The pressure drop creates a "pull" on the steam in the condensor tubes 50 which keeps the steam moving through the tubes 50. It also has a residual effect of assisting steam transfer from the cooking chamber 14 through aperture 18 so that as new steam enters the chamber 14 there is not a continuous buildup of steam in the chamber. This tends to cause better cooking performance and prevents steam from escaping out of the front of the cooking chamber 14 when the door 102 of the steam cooking device is opened.

In operation, steam is injected into the cooking chamber 14 to heat or thaw food contained therein. The pressure inside the cooking chamber 14 forces the steam to exit the cooking chamber through aperture 18 where the steam enters conduit 22 to be transported to the condensing apparatus 26 where it is to be condensed. However, upon exiting the cooking chamber 14 a small quantity of steam begins to immediately condense. For this reason, a separate cooking chamber drain 106 may be provided which directs this condensed steam (water) into the conduit 90 containing the condensate which has been condensed in the heat exchanger 30.

After the steam enters conduit 22, the steam travels to the condensing apparatus 26. The condensing apparatus 26 includes a heat exchanger 30 which is comprised of a first manifold 42 and a second manifold 46 and having a plurality of tubes 50 extending between the manifolds 42 and 46. The heat exchanger 30 may be inclined such that air blown by fans 56 will contact each of the tubes 50.

Other condensing means may be incorporated into the device 10 and are within the scope of the present invention. Any means by which air directly mixes with steam outside the cooking chamber would serve as a condenser. Also, an apparatus containing a media through which the steam must pass while it is exposed to air will serve as a useful condenser in the present invention. In such an apparatus steam passes through marbles, rocks, or other similar media while air is either pumped into the media or air suction is applied to the media to condense the steam as it passes through the media. The condensed steam then exits through a drain in the apparatus.

The steam enters the first manifold 42 through an aperture 54 which may be placed near the end 34 of the heat exchanger 30. As the steam travels through the first manifold 42, condensing of the steam through tubes 50 creates pressure differentials which cause the steam to move through the tubes 50 toward the second manifold 46. As the steam travels through the tubes 50, air is blown across the tubes 50 by the fans 56 causing the steam to quickly condense before it reaches the second manifold 46.

After the condensed steam (water) reaches the second manifold 46, the water travels down the second manifold 46 toward the end 34 of the heat exchanger 30. The water then exits the second manifold 46 through an aperture 86 into a conduit 90 or the like positioned behind the steam cooking device 10 to direct the water to a disposal or to a separate water supply for reuse.

Various features of the invention are set forth in the following claims.

What is claimed is:

1. A steam cooking device, comprising:
   a cooking chamber adapted to receive steam;
   a condensing apparatus spaced from said cooking chamber and adapted to receive steam from said cooking chamber, said condensing apparatus comprising means for collecting steam; fan means in association with said collecting means, said fan means directing a flow of air toward said collecting means to condense steam in said collecting means; and drain means in association with said collecting means for draining condensed steam from said collecting means, wherein said drain means comprises a venturi tube and an aperture upstream of said venturi tube, said aperture communicating with a compressed air source.

2. A condensing apparatus for a steam cooking device comprising:
   means for collecting steam from the cooking chamber of the steam cooking device, said collection means comprising an inlet adapted to receive steam from the steam cooking device and an outlet spaced from said inlet;
   fan means associated with said collecting means, said fan means directing a flow of air toward said collecting means to condense steam in said collecting means;
   drain means communicating with said outlet such that condensed steam travels from said collecting means through said outlet to said drain means, said drain means comprising a venturi tube and an aperture located upstream of said venturi tube, said aperture communicating with a compressed air source.

3. A method for condensing steam from the cooking chamber of a steam cooking device, comprising the steps of:
   transporting steam from the cooking chamber to means for collecting steam from the cooking chamber, said collecting means including a first manifold adapted to receive steam from the cooking chamber, a second manifold spaced from said manifold, and conduit means in fluid communication with said first and second manifolds such that steam travels from said first manifold through said conduct means to said second manifold;
   blowing air across said collecting means to condense the steam in said collecting means;
   draining said condensed stem from said second manifold through drain means in fluid communication with said second manifold;
   directing the condensed steam in said drain means through a venturi tube within said drain means; and
   injecting compressed air into said drain means upstream of said venturi tube.

* * * * *